(No Model.)

G. W. PATNOE.
TURN TABLE.

No. 486,589. Patented Nov. 22, 1892.

WITNESSES:
Jas. O. Bryan.
Ellis S. Chesbrough.

INVENTOR:
George W. Patnoe,
by G. L. Chapin.
Atty.

UNITED STATES PATENT OFFICE.

GEORGE W. PATNOE, OF CHICAGO, ILLINOIS, ASSIGNOR TO HIMSELF, JASON H. SHEPARD, AND JOHN DOLESE, OF SAME PLACE.

TURN-TABLE.

SPECIFICATION forming part of Letters Patent No. 486,589, dated November 22, 1892.

Application filed June 17, 1892. Serial No. 437,103. (No model.)

*To all whom it may concern:*

Be it known that I, GEORGE W. PATNOE, a citizen of the United States, and a resident of Chicago, county of Cook, and State of Illinois, have invented new and useful Improvements in the Construction of Turn-Tables, of which the following is a specification, reference being had to the accompanying drawings, illustrating the invention, in which—

Figure 1:
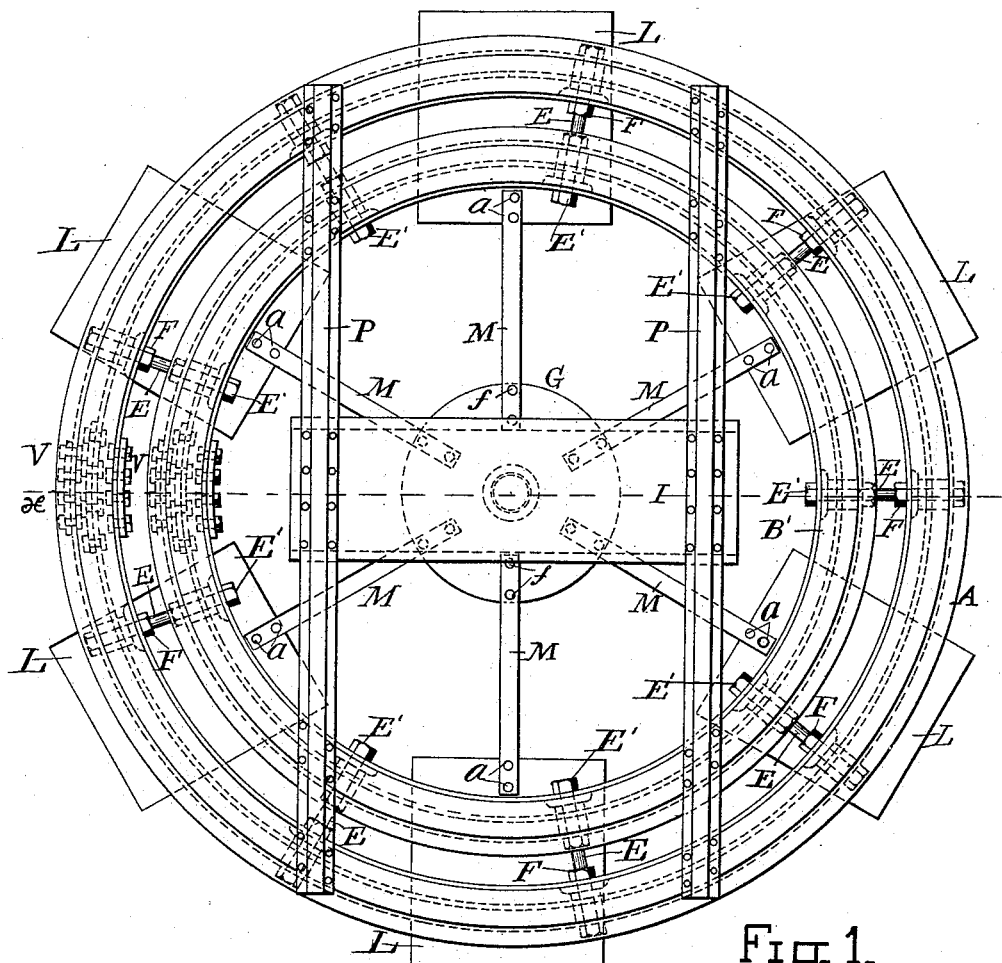
Figure 2:
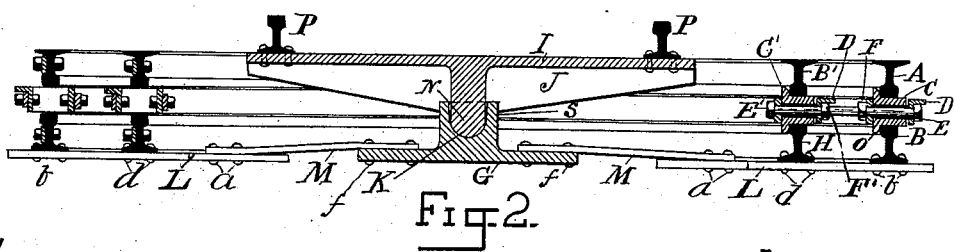

Figure 1 is a plan or top view of a turn-table in which is embodied my invention; Fig. 2, a vertical transverse section of Fig. 1 on line $x$.

The nature, construction, and operation of my invention will be fully comprehended by the following detailed description.

G represents an annular central metal base-plate, which is a part of and supports a step $s$ above, and in the step is placed the pivot N of a table I J.

L L, &c., are bed-plates, which support the exterior portions of the turn-table, and for this purpose a line cutting their centers is made to describe a circle.

The base-plate G and the bed-plate L L, &c., are connected by bars M and bolts or rivets $f a$, so the said parts are substantially a fixture with reference to each other. The first support above the plates L is an inverted-T rail B, which is bent to form a circle, and its ends are united at V by strap-plates and bolts, substantially in the same manner as railroad-rails are now spliced, except the rails are bent on a circle and the strap-plates are segments of a circle. The rail B is bolted to each of the plates L, as at $b$, Fig. 2, and it is the track on which the turn-table is rotated. Above the rail B and resting thereon are flanged rollers C O, and above the rollers and bearing on the same is a circular rail A of the same form as the rail B, but has an inverted position to it, that both rails may have like bearings on the rollers. That the rollers be held in place, they have holes formed through them, and an annular band D in L form is placed around all the rollers and bears against their outer ends, and through the L-band and through the rollers are placed headed bolts E, and the bolts at the inside of the rollers are secured by nuts and washers F, whereby when the table is turned the rollers travel between the rails A and B. The rails A B and rollers between them are sufficient support for sustaining the lighter loads; but when great strength is required I employ inside of the rails A B another set of circular rails B' H, like rails A B, rollers C', like rollers C, between them, an extension E' of bolts E, and a like L-band D. In some cases, however, I find it more convenient to employ a separate bolt E for each set of rollers.

P P are two rails mounted on the table I and on the circular rail A and on the rail B' when it is employed and securely fastened by bolts.

This turn-table thus constructed is intended to be used more especially for turning such trucks or cars as are used in stone-yards. Therefore no other means for turning the table than hand-power is contemplated; but it is obvious that power could be applied to turn the table without invention.

The construction of the device is such that it can be conveniently moved to various places in a yard where it may be required for use.

Having thus described my invention, I claim and desire to secure by Letters Patent of the United States—

An improvement in turn-tables, consisting of the central base-plate with the table I J N pivoted thereon and exterior plates L, connected with the central base-plate by bars M, in combination with a circular rail bolted to said exterior plates, rollers placed on the circular rail, a circular rail placed on said rollers, and the rollers held in position to rotate between the two rails by flanges on their inner ends, an L-shaped band surrounding the outer ends of the rollers, and by pivot-bolts, as and for the purpose specified.

GEORGE W. PATNOE.

Witnesses:
G. L. CHAPIN,
ELLIS S. CHESBROUGH.